US008041384B2

United States Patent
Italia et al.

(10) Patent No.: US 8,041,384 B2
(45) Date of Patent: Oct. 18, 2011

(54) ASSIGNING A LOCAL ACCESS TELEPHONE NUMBER TO A WIRELESS MOBILE COMMUNICATION DEVICE

(75) Inventors: William E. Italia, Howell, MI (US);
David A. Holt, Berkley, MI (US);
Garett W. Gould, Troy, MI (US);
Robert T. Weisbarth, New Boston, MI (US)

(73) Assignee: General Motors LLC, Detroit, MI (US)

( * ) Notice: Subject to any disclaimer, the term of this patent is extended or adjusted under 35 U.S.C. 154(b) by 1742 days.

(21) Appl. No.: 10/801,309

(22) Filed: Mar. 16, 2004

(65) Prior Publication Data

US 2005/0208934 A1 Sep. 22, 2005

(51) Int. Cl.
*H04M 1/00* (2006.01)

(52) U.S. Cl. ..... 455/551; 455/405; 455/406; 455/422.1; 455/432.1; 455/433; 455/461

(58) Field of Classification Search ............... 455/551, 455/422.1, 405–408, 461, 432.1, 433
See application file for complete search history.

(56) References Cited

U.S. PATENT DOCUMENTS 5,802,468 A * 9/1998 Gallant et al.
6,876,855 B1 * 4/2005 Howe

* cited by examiner

*Primary Examiner* — Charles Appiah
*Assistant Examiner* — Jaime Holliday

(57) ABSTRACT

A method and apparatus for assigning a mobile dialing number (MDN) to a wireless mobile communication device (MCD), for providing local call access to the MCD from a base address for the MCD, by first selecting a wireless rate center encompassing the base address and having an MDN providing local call access to the MCD from the base address for the MCD, and then assigning the MDN to the MCD, for providing local calling access to the MCD from the base address for the MCD. A database defines geographic boundaries of a plurality of wireless rate centers, including the wireless rate center encompassing the base address and having the MDN providing local call access to the MCD from the base address.

15 Claims, 3 Drawing Sheets

ASSIGNING A LOCAL ACCESS TELEPHONE NUMBER TO A WIRELESS MOBILE COMMUNICATION DEVICE

TECHNICAL FIELD OF THE INVENTION

This invention relates to wireless mobile communication devices, and more particularly to wireless mobile communication devices, operating in a mobile communication system, where it is desirable to provide local call access to each mobile communication device in the mobile communication system from a base address for that mobile communication device.

BACKGROUND OF THE INVENTION

It is desirable, in the operation of a mobile communication system (MCS) that provides telephone calling services, to provide local call access to a mobile communication device (MCD) utilizing the mobile communication system, from a base address (BA) for the MCD, via a wireless rate center (WRC) encompassing the base address BA for the MCD. For an MCD mounted in a vehicle, for example, the base address BA may be a garaged location of the vehicle, for example, or some other location, such as a business address or a dispatching center for the vehicle.

In such a mobile communication system MCS, an MCD typically communicates with the mobile communication system MCS at a flat rate, provided by a wireless service provider (WSP) having a special billing arrangement with the operator of the mobile communication system MCS, that rolls all incidental charges into the flat rate. For example, an MCD mounted in the vehicle may provide cellular telephone service, wireless data exchange, and access to a number of other services of the mobile communication system MCS, all at the touch of a button, and at a flat rate per minute of connection time, without additional long distance charges.

If the MCD using the mobile communication system MCS cannot be accessed from a base address BA using a local telephone number, however, the user of the MCD subscribing to the mobile communication system MCS will have to pay long distance charges to call the MCD from the base address, in addition to the flat rate charges paid for using the mobile communication system MCS. It is highly desirable that the user not be required to pay such long distance charges for communicating with the MCD from the base address BA.

In order for a subscriber of the mobile communication system MCS to be able to call the MCD from the base address BA for the MCD, without incurring long distance charges, it is necessary to assign a mobile dialing number (MDN) to the MCD that is accessible through a wireless rate center having an operating area for free local calls that encompasses the base address BA.

Prior methods for assigning an MDN to an MCD, that allows free local calls from the base address to an MCD, via a wireless rate center having an operating area for free local calls that encompasses the base address BA, have been cumbersome, and fraught with error. The drawbacks and problems in prior methods for assigning an MDN to an MCD, are the result of deficiencies in prior databases for available mobile dialing numbers MDN, and problems inherent in prior procedures that assigned the MDN on the basis of the postal zip code encompassing the base address for the MCD.

FIG. 1 shows a typical prior method 100 for assigning an MDN to an MCD operating in a mobile communication system. The process 100 is separated into two major groupings of steps 102, 104. In the first grouping 102 of steps 106-120, encompassed in dashed lines in FIG. 1, the actual MDN is assigned. In the second grouping 104 of steps 122-126, outside of the dashed lines in FIG. 1, the MDN that was assigned to the MCD in the first grouping 102 of steps 106-120 is activated by the wireless service provider WSP in steps 122-128, and the MCD is configured for operation with the MDN in step 130. If the assigned new MDN is replacing an old MDN, previously assigned to the MCD, the old MDN is deactivated in steps 132 and 134.

The prior iterative process 100 for assigning the MDN, as represented by the first grouping 102 of steps 106-120 in FIG. 1, involves several exchanges of information between the MCS operator and the WSP, and uses the postal zip code encompassing the base address as the primary input for selecting and assigning the MDN. As shown at box 106, the MCS operator starts the MDN assignment procedure by sending the zip code encompassing the base address to the WSP. As shown at box 108, the WSP uses the zip code provided by the MCS operator to prepare a list of area code and dialing prefix combinations (designated herein by the letters NPA-NXX) that are currently available from a billing identification (BID) area encompassing the zip code of the base address for the MCD. The list of NPA-NXX combinations that are available in the BID area encompassing the zip code of the base address for the MCD is sent back to the MCS operator, as shown at box 110.

The MCS operator selects an NPA-NXX combination, as shown at box 112, from the list provided by the WSP in the step of box 110. As shown at box 114, the customer may be consulted, regarding the selection of a preferred NPA-NXX combination, but this is not typically done. Typically the MCS operator selects the NPA-NXX combination without input from the customer.

The MCS operator sends the selected NPA-NXX combination back to the WSP, as shown at box 116. The WSP then selects and appends an available four digit line number (-LINE) to the selected NPA-NXX combination received from the MCS operator, to complete the ten digit mobile dialing number MDN, assigns the MDN to the MCD, and sends the assigned MDN back to the MCS operator, as shown at boxes 118 and 120.

The assigned MDN is then actuated and the MCD is configured for operation with the assigned MDN, as shown in steps 122-130, and if required, an old MDN previously assigned to the MCD is deactivated, as shown in steps 132 and 134.

Utilization of the zip code encompassing the base address, and the BID for selecting the MDN involves an inherent flaw in the MDN assignment process 100, and a risk that the MDN selected and assigned in the first grouping 102 of steps 106-120 of the prior MDN assignment process 100 will not be a telephone number that provides local call access from the base address BA to the MCD. The inherent flaw and risk are illustrated in FIG. 2.

As shown in FIG. 2, the BID area is defined by a boundary line, illustrated by phantom lines in FIG. 2, established by the wireless service provider for facilitating billing procedures of the wireless service provider. While the BID area works well for the intended purpose of facilitating billing, it is not well suited for use in assigning an MDN allowing local call access from a base address BA located within the BID area to an MCD associated with that base address BA.

As shown in FIG. 2, a particular BID area typically encompasses several zip codes, as illustrated by zones ZIP1 through ZIP4, and all or part of several wireless rate centers, as illustrated by WRC1-WRC3. As further illustrated in FIG. 2, the base address (BA) is located in zone ZIP 1 and is encompassed by wireless rate center WCR1. Unfortunately, however, the BID does not define the geographic relationship between the BA, ZIP1, and WR1-WR3 in sufficient detail to determine which of the wireless rate centers WR1-WR3 encompasses the base address BA, and which mobile dialing numbers MDN assigned to the BID are in turn assigned to the wireless rate center WR1 encompassing the base address BA, and would provide free local call access from the MCN to the base address BA.

The BID typically has, assigned to it, a list of mobile dialing numbers MDN having various NPA-NXX-LINE combinations that are not geographically associated by the BID with any particular zip code or wireless rate center encompassed by the BID. There is thus no geographic correlation between the NPA-NXX combinations in the list supplied to the MCS operator by the WSP at box 110, and the base address BA, or the zip code ZIP1 and the wireless rate center WRC 1 encompassing the base address BA. Without such a geographic correlation, the MDN assigned by the prior method 100, as shown in FIG. 1, may be available in the BID, but only provide local call access within WRC2 or WRC3, and not WRC1, thereby resulting in an MDN being assigned to the MCD that will require payment of long distance charges for communication from the base address BA the MCD.

Unfortunately this undesirable situation will likely not be recognized until the customer receives his first bill for operation of the MCD and realizes that he is incurring long distance and roaming charges in addition to the flat rate subscription charge paid to the MCS operator. Such a situation results in an unhappy customer, and requires wasted effort and increased cost to the MCS operator and WSP for repeating the MDN assignment process to change to a new MDN, assigned to wireless rate center WRC1, that allows local call access from the base address BA to the MCD.

An improved method and apparatus are required, for assigning an MDA providing local call access from a base address BA for an MCD to the MCD, via a wireless rate center encompassing a base address BA for the MCD, in a more straightforward and reliable manner.

SUMMARY OF THE INVENTION

The invention provides an improved method and apparatus for assigning a mobile dialing number (MDN) to a wireless mobile communication device (MCD). The method and apparatus provide local call access to the MCD from a base address for the MCD, by first selecting a wireless rate center encompassing the base address and having an MDN providing local call access to the MCD from the base address for the MCD. An available MDN in the selected wireless rate center is then assigned to the MCD, for providing local calling access to the MCD from the base address for the MCD. Selecting a wireless rate center providing local call access to the MCD from the base address, prior to assignment of an MDA assigned to that wireless rate center, precludes erroneous assignment of an MDA that would require long distance charges for placing a call from the base address to the MCD, and unnecessary cost for assigning a different MDN that does allow local call access.

In one form of the invention, a database is compiled that defines geographic boundaries of a plurality of wireless rate centers. A wireless rate center encompassing the base address for the MCD, and having an available MDN providing local call access from the base address BA to the MCD, is then selected from the database. Such a database has not previously existed in the mobile communication industry.

The base address may be converted to a geographic location, such as a latitude and longitude, and the wireless rate center may be selected from those wireless rate centers in the database having geographic boundaries encompassing the geographic location of the base address.

The wireless rate center may be selected by an entity other than a wireless service provider, such as a mobile communication system operator, for example, prior to contacting the wireless service provider for assignment of the MDN by the wireless service provider, to thereby eliminate much of the iteration required in prior MDN assignment processes.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 3:
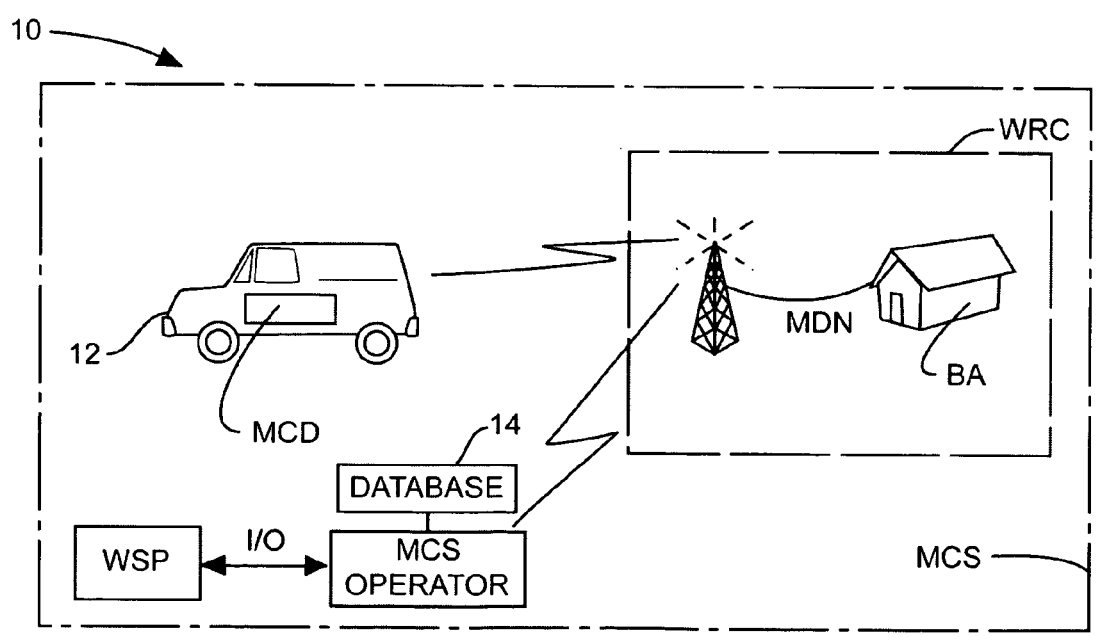
FIG. 3 is a schematic representation of elements of an apparatus according to the present invention.

FIG. 3 depicts an exemplary embodiment of an apparatus 10, according to the invention, for assigning a mobile dialing number (MDN) to a wireless mobile communication device (MCD) located in a vehicle 12, for providing local call access to the MCD from a base address (BA) for the MCD, through a mobile communication system (MCS) operated by a mobile communication system (MCS) operator, via a wireless rate center (WRC) contracted by a wireless service provider (WSP).

The apparatus 10 includes hardware and/or software in the MCD, MCS, WRC, or operated by the WSP, for performing operations including but not limited to: selecting a wireless rate center WRC encompassing the base address BA and having an MDN providing local call access to the MCD from the base address for the MCD; assigning the MDN to the MCD, to thereby provide local calling access to the MCD from the base address for the MCD; activating the MDN; and for configuring the MCD for operation with the assigned MDN.

The apparatus 10 also includes hardware and/or software in the MCS constituting a database 14 defining geographic boundaries of a plurality of wireless rate centers, including the wireless rate center WRC encompassing the base address BA and having an MDN providing local call access to the MCD from the base address for the MCD. The apparatus 10 further includes hardware and/or software in the MCS for selecting a wireless rate center WRC, encompassing the base address BA and having an MDN providing local call access to the MCD from the base address for the MCD, from the database 14. It is preferred that the apparatus 10 also include hardware and/or software for converting the base address BA to a geographic location and selecting the wireless rate center WRC from those wireless rate centers in the database 14 having geographic boundaries encompassing the geographic location of the base address BA.

The apparatus 10 also includes input/output provisions I/O for communication between the wireless service provider WSP and the mobile communication system MCS operator. The mobile communication system MCS is configured so that the MCS operator can select the desired wireless rate center WRC from the database 14, prior to contacting a wireless service provider WSP. The I/O provisions are configured for transmitting a designation of the selected wireless rate center WRC to the wireless service provider WSP for assignment of the MDN by the wireless service provider. The apparatus 10 further includes hardware, and/or software, that allows the WSP to assign the MDN to the mobile communication device MCD in the vehicle 12, and transmit the assigned MDN to the MCS operator, for configuring the MCD for operation with the assigned MDN.

Figure 4:
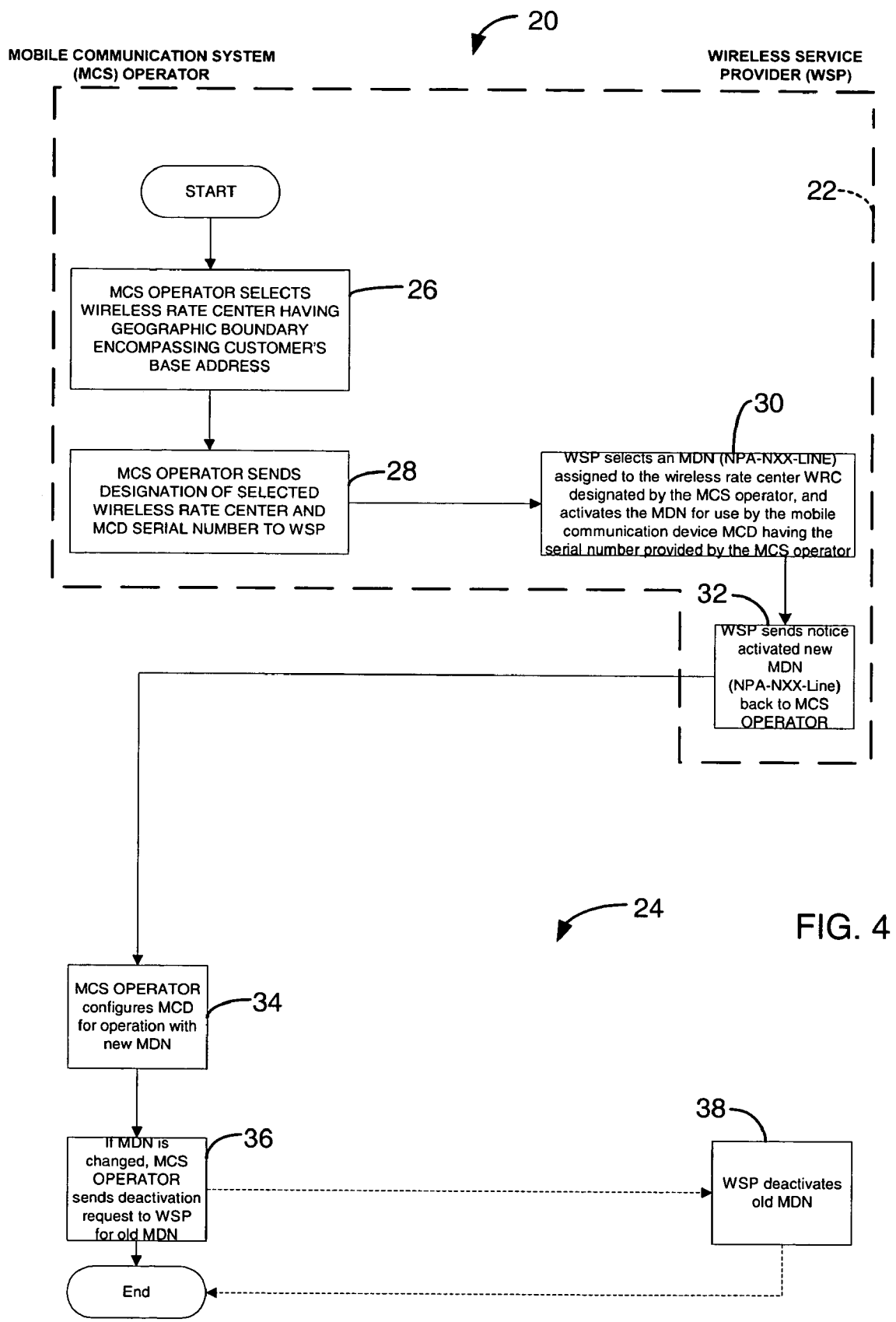
FIG. 4 is a flowchart illustrating an exemplary embodiment of an MDA assignment process, according to the present invention.

FIG. 4 shows an exemplary embodiment of a method 20, according to the invention, for assigning a new mobile dialing number MDN to a mobile communication device MCD.

The method 20 is separated into two major groupings of steps 22, 24. In the first grouping 22 of steps 26-32, encompassed in dashed lines in FIG. 4 the actual MDN is assigned. In the second grouping 24 of steps 34-38, located outside of the dashed lines in FIG. 4, the MDN is activated by the wireless service provider WSP, and the MCD is configured for operation with the MDN. The steps 26-32 in the first grouping 22, for assigning the MDN, are considerably different from the steps 106-120 of the first grouping of steps 102 in the prior method of FIG. 1, as will be readily recognized by comparing FIG. 1 with FIG. 4. The differences between steps 26-32 in the first grouping of steps 22 of the exemplary embodiment of the method 20, and the steps 106-120 of the first grouping 10 of steps in the prior method 100, allow elimination of more than half of the steps 122-134 required in the second grouping 104 of the prior method of FIG. 1.

Figure 1:
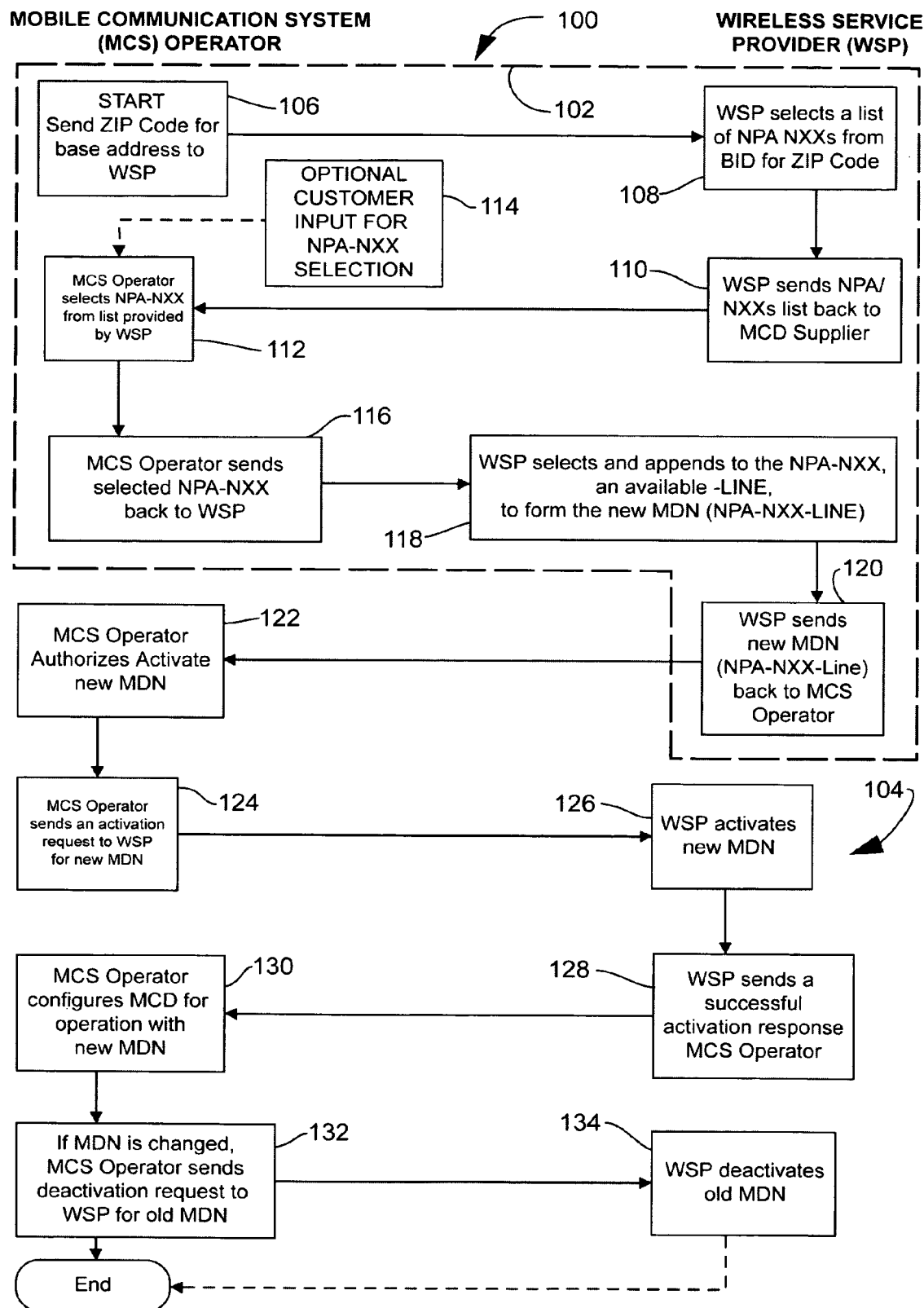
FIG. 1 is a flowchart representing a prior method for assigning a mobile dialing number (MDN) to a mobile communication device (MCD)
Figure 2:
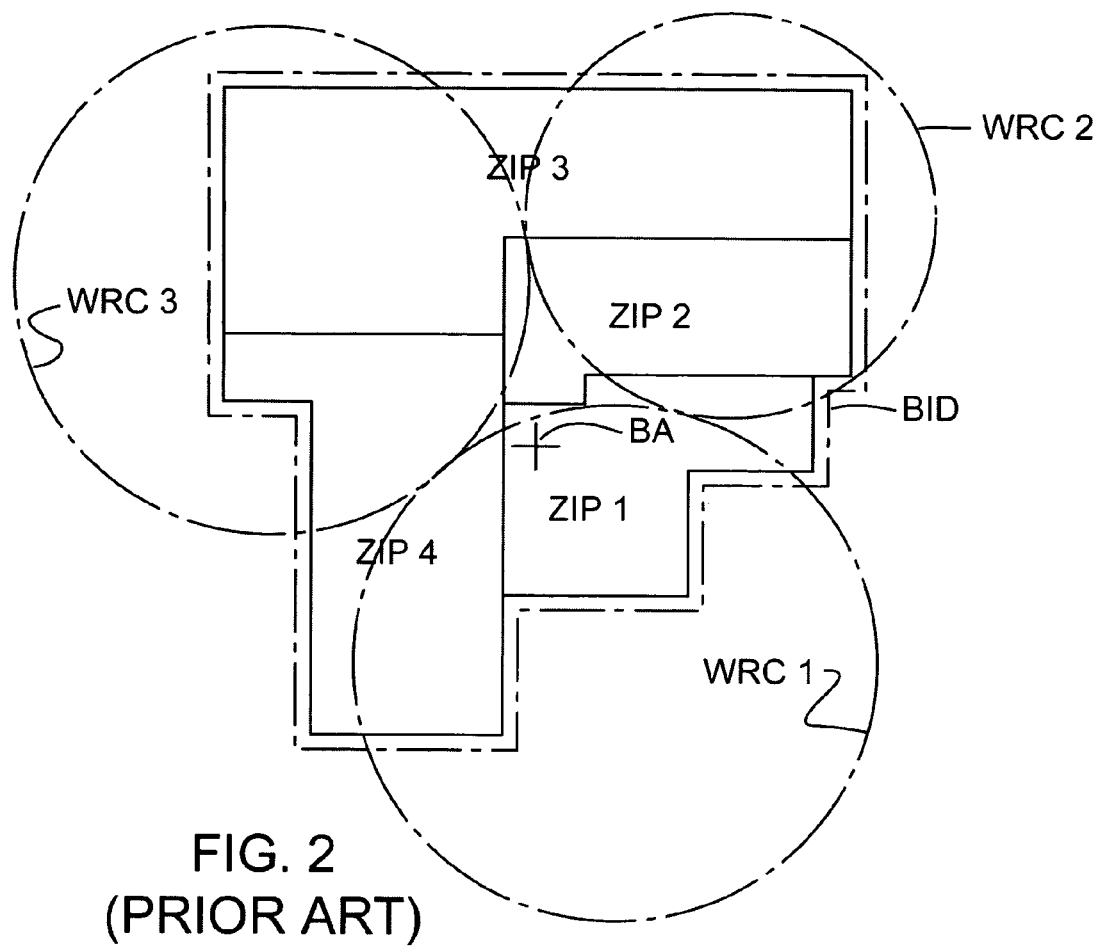
FIG. 2 is an illustration of salient features of a billing identifier (BID) area used in the process of FIG. 1.

The method 20 of the exemplary embodiment of the invention, as shown in FIG. 4, includes fewer steps in the first grouping 22, for assigning the MDN, than were required for assigning an MDN in the prior method of FIG. 1. Only one exchange of information is required between the MCS operator and the wireless service provider WSP in the first grouping of steps 22, and the process ensures that the MDN selected in steps 26-32 of the method 20, according to the invention, will provide local call access to the MCD from the base address BA for the MDA.

As shown, in FIG. 4, the process 22 for assigning the MDN starts with the MCS operator selecting a wireless rate center WRC having a geographic boundary encompassing the customer's base address BA, as shown at box 26. The MCS operator sends a designation of the selected wireless rate center WRC and a serial number of the mobile communication device MCD to the wireless service provider WSP, as shown at box 28.

The wireless service provider WSP then selects an available MDN (NPA-NXX-LINE) that is assigned to the wireless rate center WRC designated by the MCS operator, and activates the selected MDN for use by the mobile communication device MCD having the serial number provided by the MCS operator, as shown in box 30. The WSP sends the MDN and a notice of activation of the MDN back to the MCS operator, as shown in box 32. The MDN that is selected and activated as described above will provide local call access to the MCD from the base address BA, because the method limits the MDN selection process to only those available MDNs that are assigned to the wireless rate center WRC encompassing the base address BA, that was pre-selected by the MCS operator in step 26.

As shown at box 34, the wireless service provider WSP configures the MCD for operation with the MDN received from the wireless service provider WSP. If the new MDN is replacing a previously assigned old MDN, the MCS operator sends a request to the wireless service provider WSP that the old MDN be deactivated, and the wireless service provider WSP deactivates the old MDN, as shown in boxes 36 and 38.

The step of selecting a wireless rate center WRC having a geographic boundary encompassing the base address BA, shown in box 26, may also include compiling a database defining geographic boundaries of a plurality of wireless rate centers, and selecting the wireless rate center WRC having a geographic boundary encompassing the customer's base address BA from the database. To facilitate selection of the wireless rate center having a geographic boundary encompassing the customer's base address BA, the method may include converting the base address BA to a geographic location and selecting the wireless rate center from those wireless rate centers in the database having geographic boundaries encompassing the geographic location of the base address BA. The geographic boundaries of the wireless rate centers, and the geographic location of the base address BA are preferably defined in terms of latitude and longitude.

While the embodiments of the invention disclosed herein are presently considered to be preferred, various changes and modifications can be made without departing from the spirit and scope of the invention. For example, the invention may be practiced with mobile communication devices that are not mounted in a vehicle. The invention may also be utilized with MDN formats other than the ten-digit NPA-NXX-LINE format used herein for illustrative purposes.

The scope of the invention is indicated in the appended claims. It is intended that all changes or modifications within the meaning and range of equivalents are embraced by the claims.

We claim:

1. A method for assigning a mobile dialing number (MDN) to a wireless mobile communication device (MCD) for providing local call access to the MCD from a base address for the MCD, the method comprising:
    selecting a wireless rate center encompassing the base address and having an MDN providing local call access to the MCD from the base address for the MCD; and
    assigning the MDN providing local calling access to the MCD from the base address for the MCD, in the selected wireless rate center encompassing the base address, to the MCD.

2. The method of claim 1, further comprising, activating the assigned MDN.

3. The method of claim 2, further comprising, configuring the MCD for operation with the assigned MDN.

4. The method of claim 1, further comprising:
    compiling a database defining geographic boundaries of a plurality of wireless rate centers; and
    selecting the wireless rate center of claim 1 from the database.

5. The method of claim 4, further comprising, converting the base address to a geographic location and selecting the wireless rate center from those wireless rate centers in the database having geographic boundaries encompassing the geographic location of the base address.

6. The method of claim 5, further comprising, defining the geographic boundaries of the wireless rate centers and the geographic location of the base address in terms of latitude and longitude.

7. The method of claim 1 further comprising:

selecting the wireless rate center prior to contacting a wireless service provider, and transmitting a designation of the selected wireless rate center to a wireless service provider for assignment of the MDN by the wireless service provider.

8. The method of claim 7, further comprising assigning the MDN and transmitting the assigned MDN to an entity other than the wireless service provider for configuring the MCD for operation with the assigned MDN.

9. The method of claim 7, further comprising transmitting a serial number of the MCD to the wireless service provider together with the designation of the selected wireless rate center.

10. The method of claim 9, further comprising assigning the MDN and transmitting the serial number, together with the assigned MDN, to an entity other than the wireless service provider for configuring the MCD for operation with the assigned MDN.

11. An apparatus for assigning a mobile dialing number combination (MDN) to a wireless mobile communication device (MCD) for providing local call access to the MCD from a base address for the MCD, the apparatus comprising:

means for selecting a wireless rate center encompassing the base address and having an MDN providing local call access to the MCD from the base address for the MCD; and means for assigning the MDN providing local calling access to the MCD from the base address for the MCD, in the selected wireless rate center encompassing the base address, to the MCD.

12. The apparatus of claim 11, further comprising:

a database defining geographic boundaries of a plurality of wireless rate centers; and means for selecting the wireless rate center from the database.

13. The apparatus of claim 12, further comprising, means for converting the base address to a geographic location and selecting the wireless rate center from those wireless rate centers in the database having geographic boundaries encompassing the geographic location of the base address.

14. The apparatus of claim 11, further comprising:

means for selecting the wireless rate center prior to contacting a wireless service provider; and means for transmitting a designation of the selected wireless rate center to a wireless service provider for assignment of the MDN by the wireless service provider.

15. The apparatus of claim 11, further comprising, means for assigning the MDN and transmitting the assigned MDN to an entity other than the wireless service provider for configuring the MCD for operation with the assigned MDN.

* * * * *